(12) United States Patent
Liu

(10) Patent No.: US 10,019,016 B2
(45) Date of Patent: Jul. 10, 2018

(54) SELF POSITIONING SYSTEM AND AUTONOMOUSLY MOBILE DEVICE USING THE SAME

(71) Applicant: HON HAI PRECISION INDUSTRY CO., LTD., New Taipei (TW)

(72) Inventor: Tien-Ping Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 58 days.

(21) Appl. No.: 15/357,954

(22) Filed: Nov. 21, 2016

(65) Prior Publication Data

US 2018/0039277 A1    Feb. 8, 2018

(30) Foreign Application Priority Data

Aug. 4, 2016   (TW) .............................. 105124852 A

(51) Int. Cl.
  *G05D 1/02*    (2006.01)
  *G06T 7/00*    (2017.01)
  *B05B 12/12*   (2006.01)
  *B05B 12/14*   (2006.01)

(52) U.S. Cl.
  CPC .......... *G05D 1/0253* (2013.01); *B05B 12/12* (2013.01); *B05B 12/14* (2013.01); *G06T 7/0042* (2013.01)

(58) Field of Classification Search
  CPC ...... G05D 1/0253; B05B 12/14; B05B 12/12; G06T 7/0042
  See application file for complete search history.

(56) References Cited

U.S. PATENT DOCUMENTS

2017/0102467 A1*   4/2017   Nielsen .................. G01S 19/47

\* cited by examiner

*Primary Examiner* — Mary D Cheung
(74) *Attorney, Agent, or Firm* — ScienBiziP, P.C.

(57) ABSTRACT

The disclosure relates to a self positioning system and an autonomously mobile device using the same. The self positioning system is installed on the autonomously mobile device at work. The self positioning system includes a controlling module, an image acquisition module configured to acquire an image of the surrounding environment of the autonomously mobile device, an image dealing module configured to deal the image of the surrounding environment by selecting the feature point, and a calculating module configured to calculate position information of the autonomously mobile device according to the position change of the same feature point in different images. The self positioning system further includes a spraying module configured to spray liquid or paste to form a feature point in the surrounding environment.

20 Claims, 11 Drawing Sheets

SELF POSITIONING SYSTEM AND AUTONOMOUSLY MOBILE DEVICE USING THE SAME

CROSS-REFERENCE TO RELATED APPLICATIONS

This application claims all benefits accruing under 35 U.S.C. § 119 from Taiwan Patent Application No. 105124852, filed on Aug. 4, 2016, in the Taiwan Intellectual Property Office, the contents of which are hereby incorporated by reference.

FIELD

The subject matter herein generally relates to autonomously mobile devices, particularly, to an autonomously mobile device having a self positioning system base on visual odometry.

BACKGROUND

Simultaneous localization and mapping (SLAM) is often used in the autonomously mobile device, such as a robot, to position. Simultaneous localization and mapping needs lots of sensor, such as global positioning system (GPS), inertial measurement unit (IMU), or odometry, to provide information to position.

For a robot using mecanum wheels or omnidirectional wheel, the speed of the wheel cannot indicate the displacement of the robot and the accumulative error would be increased by the wheel spinning and slipping. When the robot is indoor, the global positioning system is unsuitable, but the inertial measurement unit and the visual odometry is better to detect the displacement of the robot. The visual odometry judges the displacement of the robot by acquiring lots of images of the surrounding environment and comparing the same feature point of the lots of images. However, when the surrounding environment, such as a cement floor without any crack or a white wall, does not have any feature point, the visual odometry cannot judges the displacement of the robot by acquiring enough feature points.

What is needed, therefore, is to provide a self positioning system which can overcome the shortcomings as described above and an autonomously mobile device using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
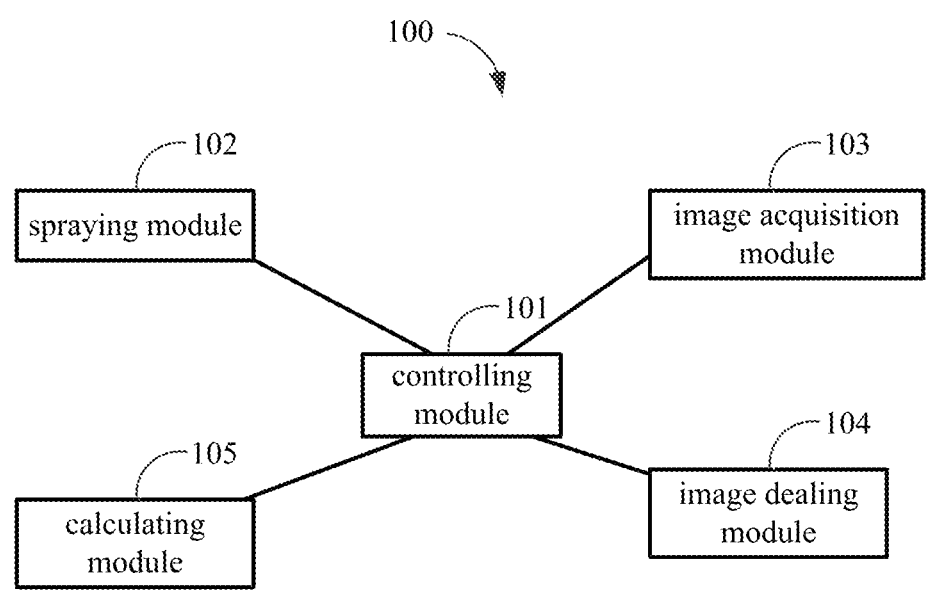
FIG. 1 is a functional diagram of a first embodiment of a self positioning system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to illustrate details and features. The description is not to considered as limiting the scope of the embodiments described herein.

Several definitions that apply throughout this disclosure will now be presented.

The connection can be such that the objects are permanently connected or releasably connected. The term "inside" indicates that at least a portion of a region is partially contained within a boundary formed by the object. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Referring to FIG. 1, a self positioning system 100 of the first embodiment is provided. The self positioning system 100 includes a controlling module 101, a spraying module 102, an image acquisition module 103, an image dealing module 104 and a calculating module 105. The spraying module 102, the image acquisition module 103, the image dealing module 104 and the calculating module 105 are electrically connected to the controlling module 101. The image acquisition module 103, the image dealing module 104 and the calculating module 105 form a visual odometry. The self positioning system 100 can be installed on an autonomously mobile device, such as a robot, drones, autonomous ground vehicles, or motorcycles.

The controlling module 101 is configured to control the work of the self positioning system 100. The spraying module 102 is configured to spray liquid or paste to form a feature point in the surrounding environment such as floor or wall. The liquid or paste can be color, such as paint or ink. The liquid or paste can also be colorless and transparent, such as water or alcohol. The drop of water or alcohol can also be used as feature point when it can be distinguished from the surrounding environment. The liquid or paste are environmentally-friendly and volatile in room temperature. The liquid or paste should be remained in the surrounding environment for a certain period after being sprayed out and attached on the surrounding environment. The image acquisition module 103 is configured to acquire a plurality of images of the feature point and the surrounding environment. The image dealing module 104 is configured to deal the images of the feature point and the surrounding environment by selecting the feature point in each image. The calculating module 105 is configured to calculate the position information of the self positioning system 100 according to the position change of the same feature point in different images.

The structure of the spraying module 102 is not limited and can be selected according to need. In one embodiment, the spraying module 102 includes a container configured to carry the liquid or paste, a nozzle configured to spray the liquid or paste, and an adjusting device configured to adjust the spraying direction. The image acquisition module 103 includes a camera having a CCD sensor or CMOS sensor.

Figure 2:
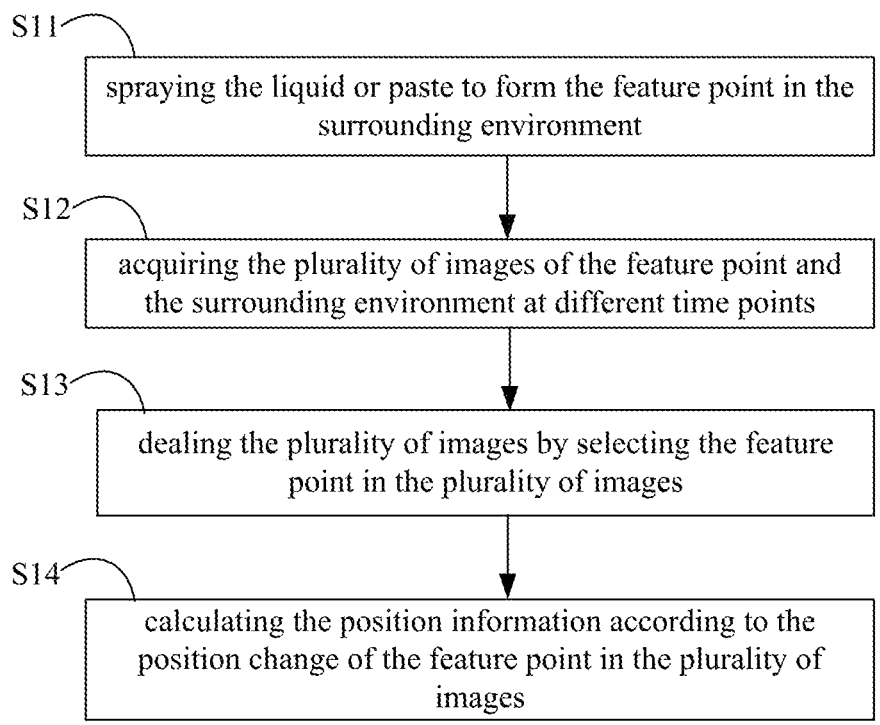
FIG. 2 is a work flow chart of the first embodiment of the self positioning system.

Referring to FIG. 2, the work method of the self positioning system 100 of the first embodiment includes following steps:

step (S11), spraying the liquid or paste to form the feature point in the surrounding environment, and go to step (S12);

step (S12), acquiring the plurality of images of the feature point and the surrounding environment at different time points, and go to step (S13);

step (S13), dealing the plurality of images by selecting the feature point in the plurality of images, and go to step (S14); and step (S14), calculating the position information according to the position change of the feature point in the plurality of images.

In step (S11), the liquid or paste is sprayed to form the feature point in the visual field of the image acquisition module 103 by the spraying module 102. The liquid or paste can be sprayed to form a single feature point or a plurality of feature points with different colors, different sizes, different shapes or different intervals, in once spraying process. The liquid or paste can also be sprayed to form the same or different feature points with a time interval.

In step (S12), the image acquisition time interval of the image acquisition module 103 is not limited and can be selected according to need. In one embodiment, the image acquisition time interval of the image acquisition module 103 is in a range from about 1 second to about 5 seconds. The image acquisition module 103 can acquire an image having a single feature point or a plurality of feature points. The images can be stored first after being acquired.

In step (S13), a single feature point or a plurality of feature points can be selected and marked from the image including the feature point and the surrounding environment. In one embodiment, the number of the selected and marked feature point can be in a range from 1 to 3.

In step (S14), the position information of the self positioning system 100 can be calculated according to the position change of one selected feature point in different images. If a plurality of feature points are selected in step (S13), a plurality of position information of the self positioning system 100 can be calculated. Thus, a corrected position information can be calculated according to the plurality of position information by averaging.

Figure 3:
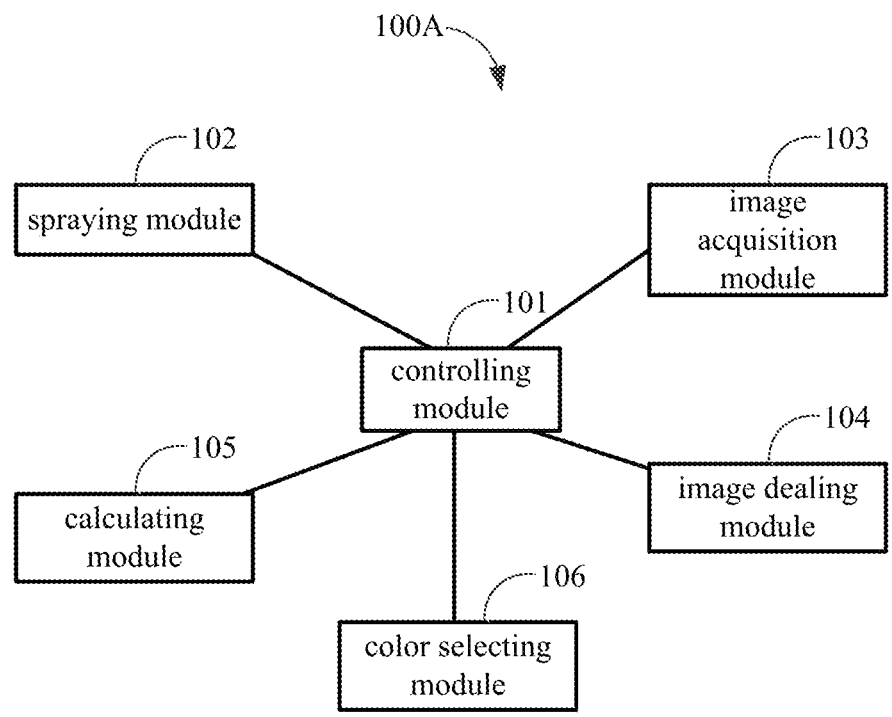
FIG. 3 is a functional diagram of a second embodiment of a self positioning system.

Referring to FIG. 3, a self positioning system 100A of the second embodiment is provided. The self positioning system 100A includes a controlling module 101, a spraying module 102, an image acquisition module 103, an image dealing module 104, a calculating module 105 and a color selecting module 106.

The self positioning system 100A is similar to the self positioning system 100 above except that the self positioning system 100A further includes the color selecting module 106 electrically connected to the controlling module 101. The color selecting module 106 is configured to analysis the first color of the surrounding environment and select the second color of the liquid or paste so that the second color of the feature point is different from the first color of the surrounding environment. Thus, the spraying module 102 can spray the liquid or paste having the second color selected by the color selecting module 106.

Figure 4:
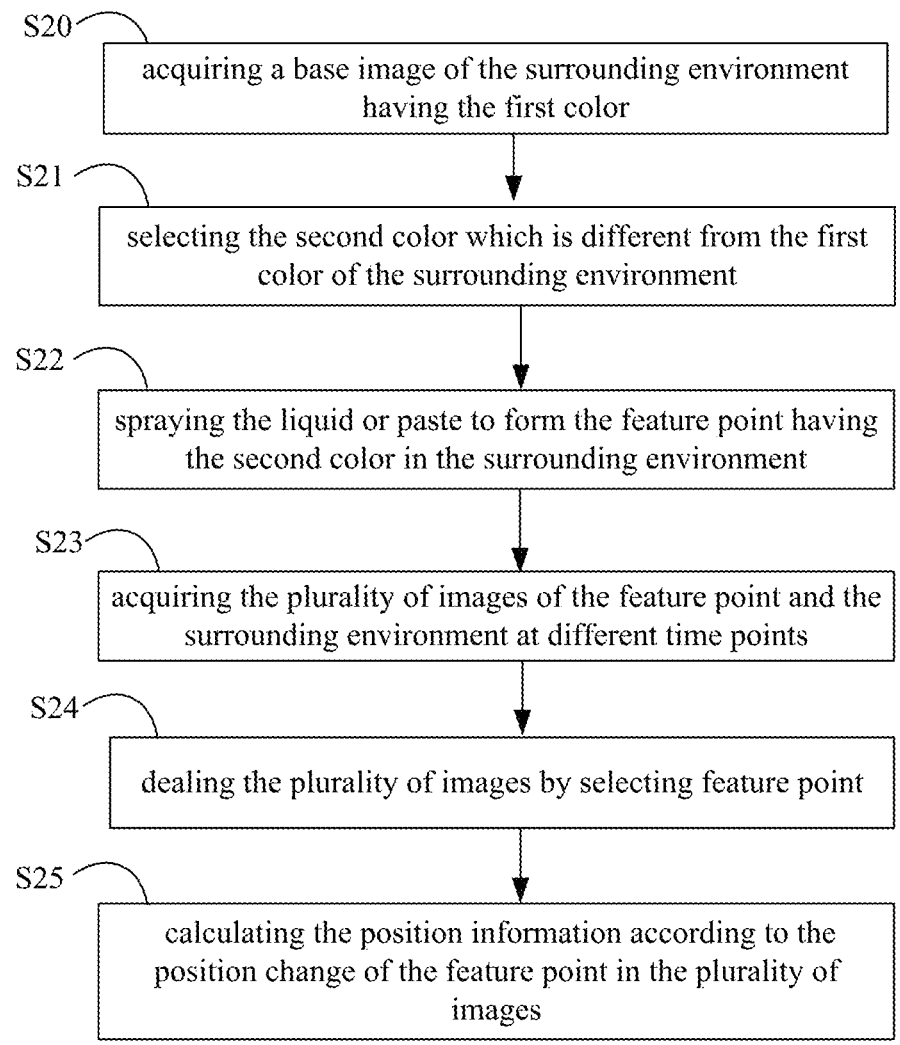
FIG. 4 is a work flow chart of the second embodiment of the self positioning system.

Referring to FIG. 4, the work method of the self positioning system 100A of the second embodiment includes following steps:

step (S20), acquiring a base image of the surrounding environment having the first color, and go to step (S21);

step (S21), selecting the second color which is different from the first color of the surrounding environment, and go to step (S22);

step (S22), spraying the liquid or paste to form the feature point having the second color in the surrounding environment, and go to step (S23);

step (S23), acquiring the plurality of images of the feature point and the surrounding environment at different time points, and go to step (S24);

step (S24), dealing the plurality of images by selecting the feature point, and go to step (S25); and step (S25), calculating the position information according to the position change of the feature point in the plurality of images.

Figure 5:
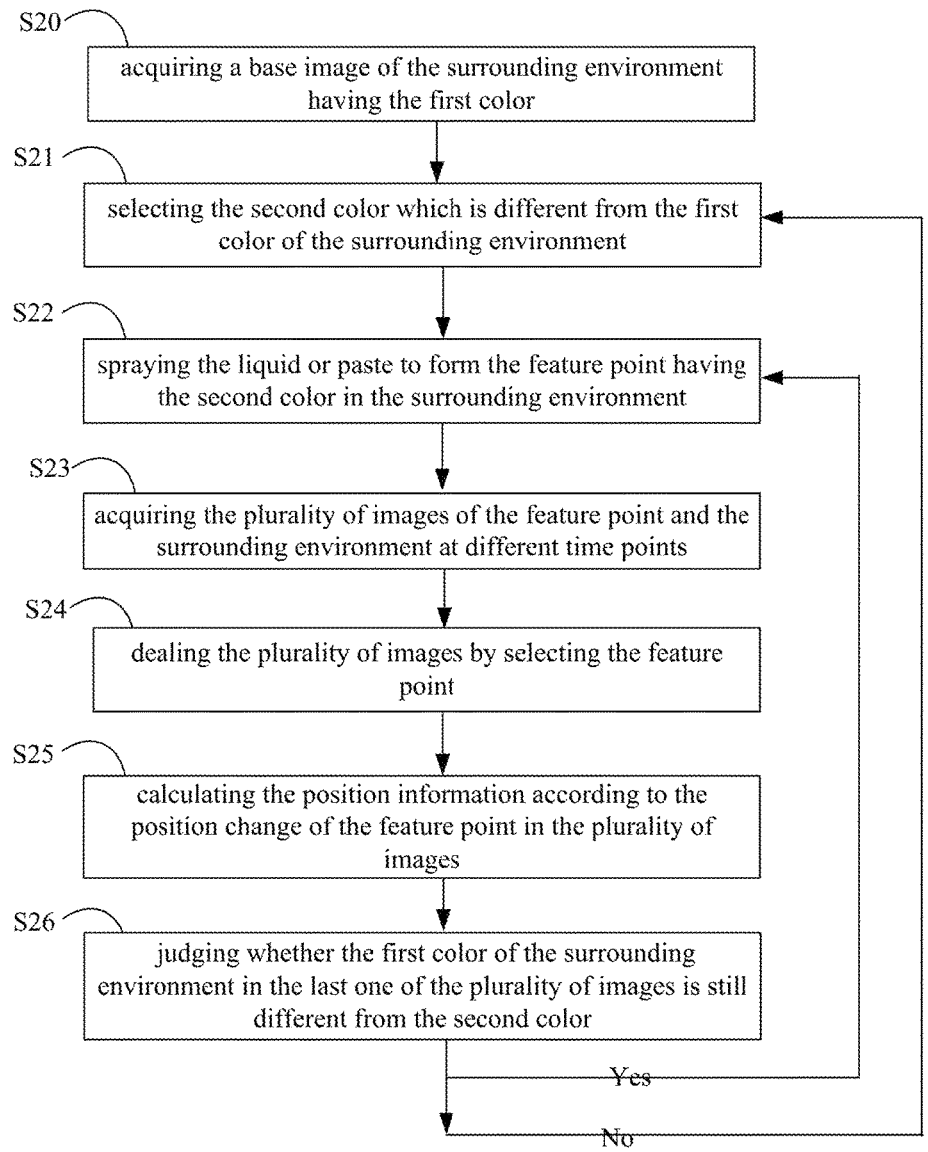
FIG. 5 is another work flow chart of the second embodiment of the self positioning system.

Referring to FIG. 5, the work method of the self positioning system 100A of the second embodiment can also includes following steps:

step (S20), acquiring a base image of the surrounding environment having the first color, and go to step (S21);

step (S21), selecting the second color which is different from the first color of the surrounding environment, and go to step (S22);

step (S22), spraying the liquid or paste to form the feature point having the second color in the surrounding environment, and go to step (S23);

step (S23), acquiring the plurality of images of the feature point and the surrounding environment at different time points, and go to step (S24);

step (S24), dealing the plurality of images by selecting the feature point, and go to step (S25);

step (S25), calculating the position information according to the position change of the feature point in the plurality of images, and go to step (S26); and step (S26), judging whether the first color of the surrounding environment in the last one of the plurality of images is still different from the second color, if yes, go back to step (S22), if no, go back to step (S21).

In step (S21), the second color and the first color should be distinguishable to the color distinguish module (not shown) of the image dealing module 104. A threshold of the difference between the second color and the first color can be set. When the difference between the second color and the first color is greater than or equal to the threshold, the second color and the first color are distinguished as different colors. When the difference between the second color and the first color is less than the threshold, the second color and the first color are regarded the same color. In one embodiment, the surrounding environment is gray cement floor and the color of the feature point can be white or green. In one embodiment, the surrounding environment is white wall and the color of the feature point can be black or red.

According to step (S26), when it is found that the surrounding environment is changed to have the same color with the feature point, the color of the feature point would be changed.

Figure 6:
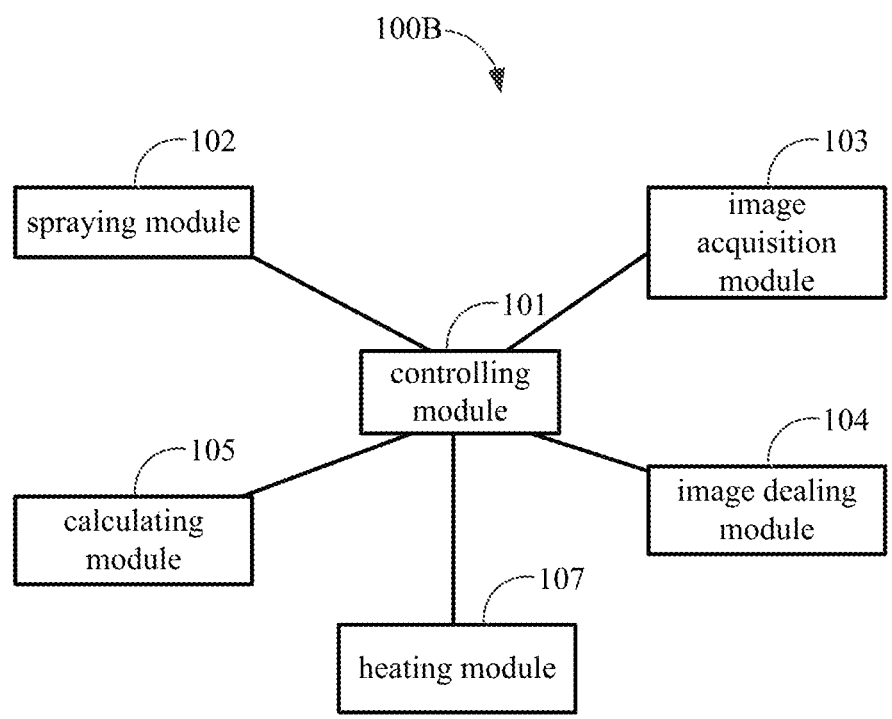
FIG. 6 is a functional diagram of a third embodiment of a self positioning system.

Referring to FIG. 6, a self positioning system 100B of the third embodiment is provided. The self positioning system 100B includes a controlling module 101, a spraying module 102, an image acquisition module 103, an image dealing module 104, a calculating module 105 and a heating module 107.

The self positioning system 100A is similar to the self positioning system 100 above except that the self positioning system 100A further includes the heating module 107 electrically connected to the controlling module 101. The heating module 107 is configured to heat the feature points that are in the surrounding environment and formed by the liquid or paste so that the feature points can be completely removed from the surrounding environment by volatilization or evaporation. The structure of the heating module 107 is not limited and can be selected according to need. In one embodiment, the heating module 107 includes air drying device or light heating device, such as laser device.

Figure 7:
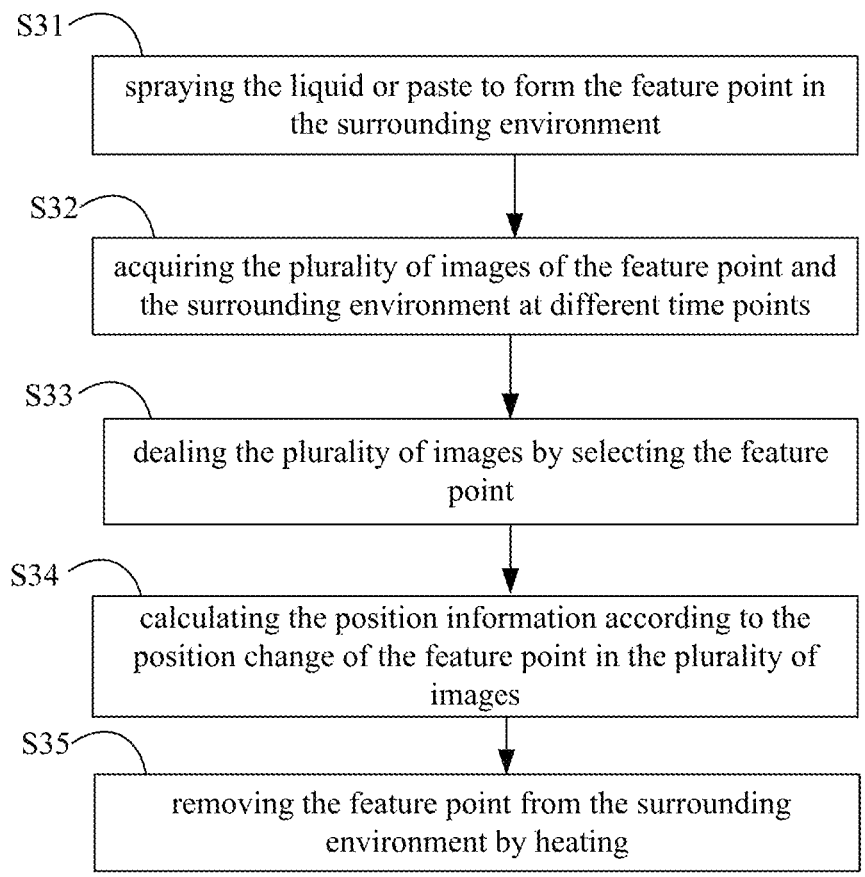
FIG. 7 is a work flow chart of the third embodiment of the self positioning system.

Referring to FIG. 7, the work method of the self positioning system 100B of the third embodiment includes following steps:

step (S31), spraying the liquid or paste to form the feature point in the surrounding environment, and go to step (S32);

step (S32), acquiring the plurality of images of the feature point and the surrounding environment at different time points, and go to step (S33);

step (S33), dealing the plurality of images by selecting the feature point, and go to step (S34);

step (S34), calculating the position information according to the position change of the feature point in the plurality of images, and go to step (S35); and step (S35), removing the feature point from the surrounding environment by heating.

In step (S35), the heating process can be performed once with a time interval. Alternatively, the heating process can be performed once under a certain condition as below.

Figure 8:
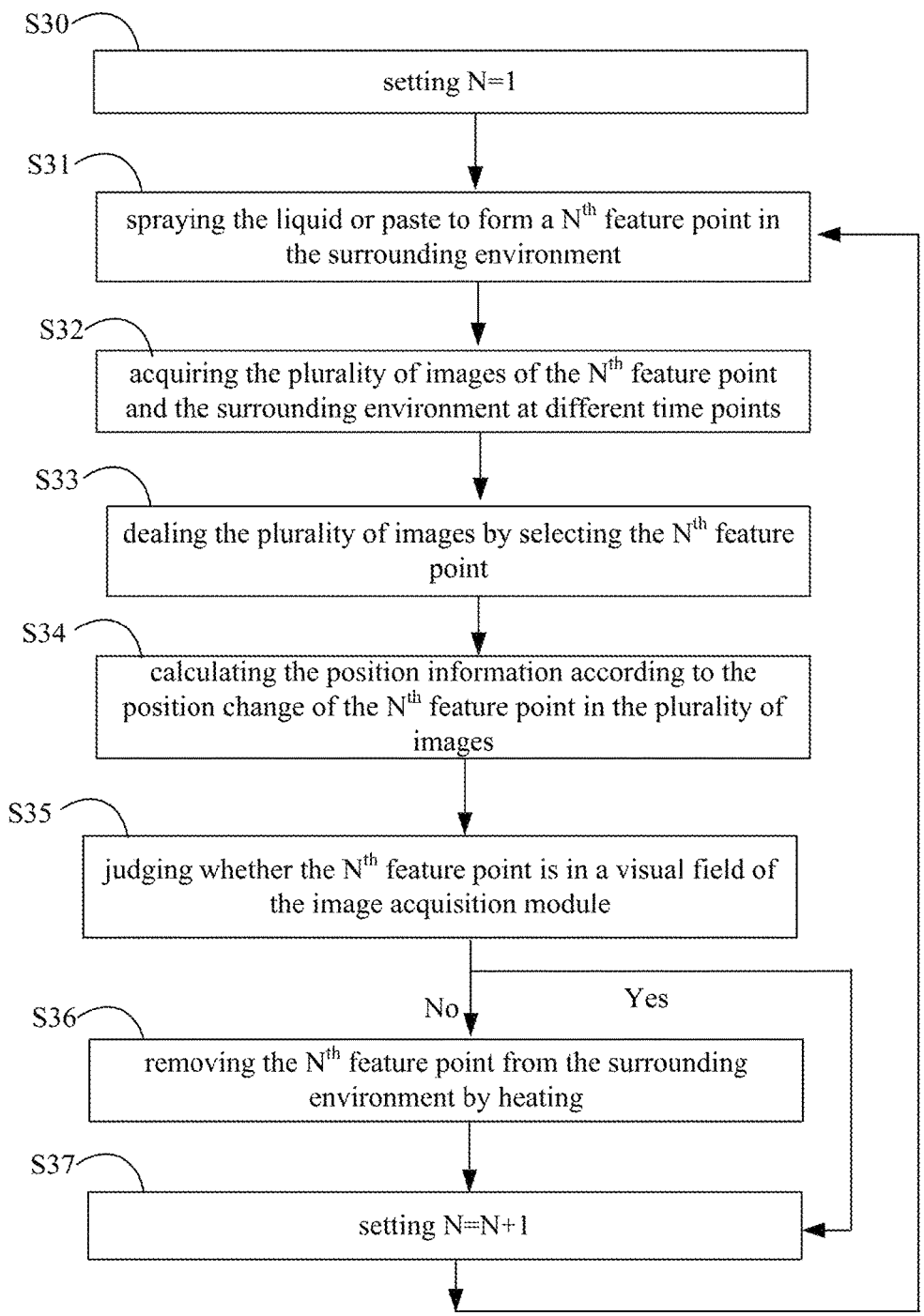
FIG. 8 is another work flow chart of the third embodiment of the self positioning system.

Referring to FIG. 8, the work method of the self positioning system 100B of the third embodiment can also includes following steps:

step (S30), setting N=1, and go to step (S31);

step (S31), spraying the liquid or paste to form a $N^{th}$ feature point in the surrounding environment, and go to step (S32);

step (S32), acquiring the plurality of images of the $N^{th}$ feature point and the surrounding environment at different time points, and go to step (S33);

step (S33), dealing the plurality of images by selecting the $N^{th}$ feature point, and go to step (S34);

step (S34), calculating the position information according to the position change of the $N^{th}$ feature point in the plurality of images, and go to step (S35);

step (S35), judging whether the $N^{th}$ feature point is in a visual field of the image acquisition module, if yes, go to step (S37), if no, go to step (S36);

step (S36), removing the $N^{th}$ feature point from the surrounding environment by heating, and go to step (S37); and step (S37), setting N=N+1, and go back to step (31).

Figure 9:
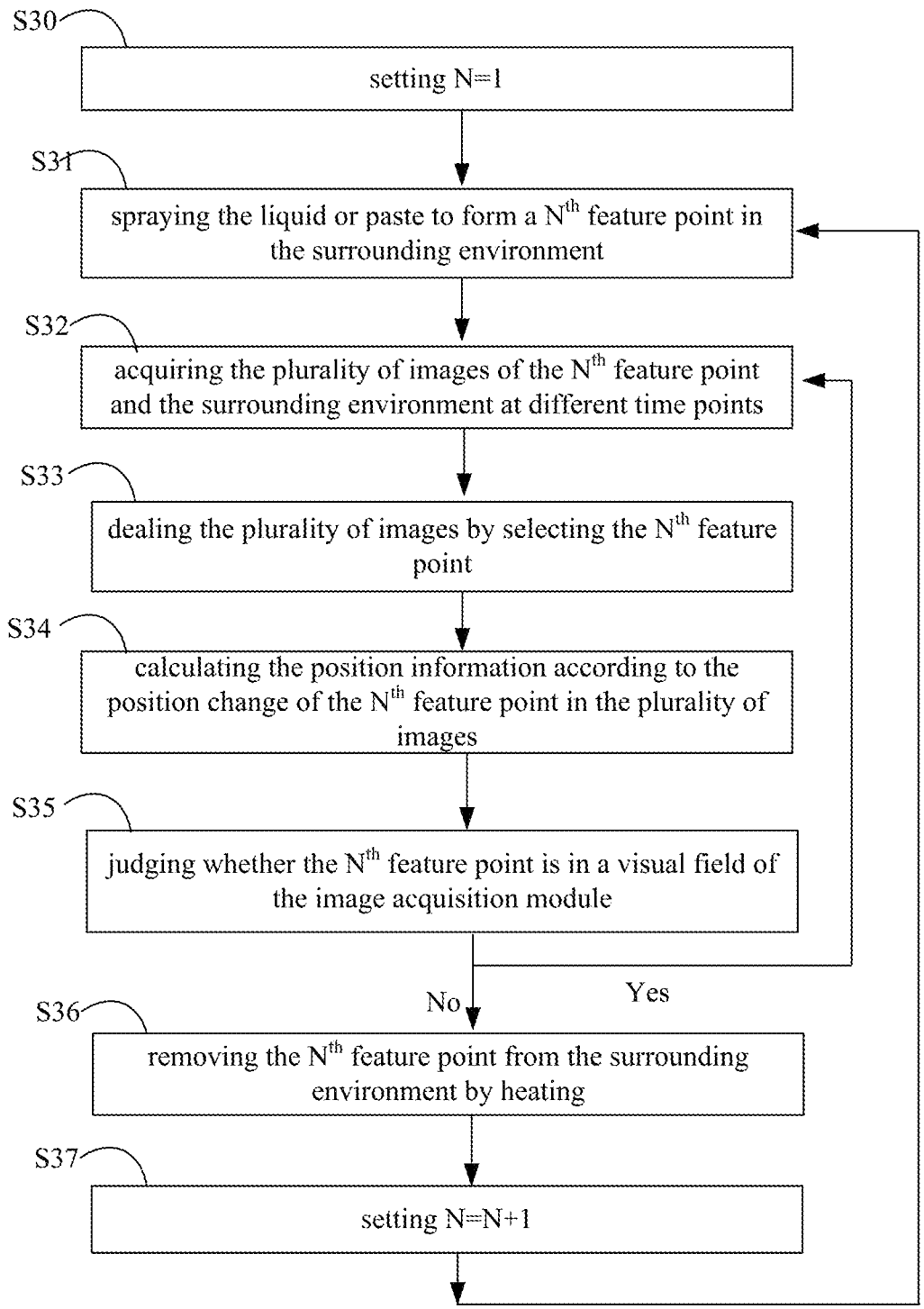
FIG. 9 is another work flow chart of the third embodiment of the self positioning system.

In step (S35), if yes, it can also be that go back to step (S32) as shown in FIG. 9. In step (S36), the $N^{th}$ feature point would be removed by heating when the $N^{th}$ feature point would not be acquired by the image acquisition module 103.

Figure 10:
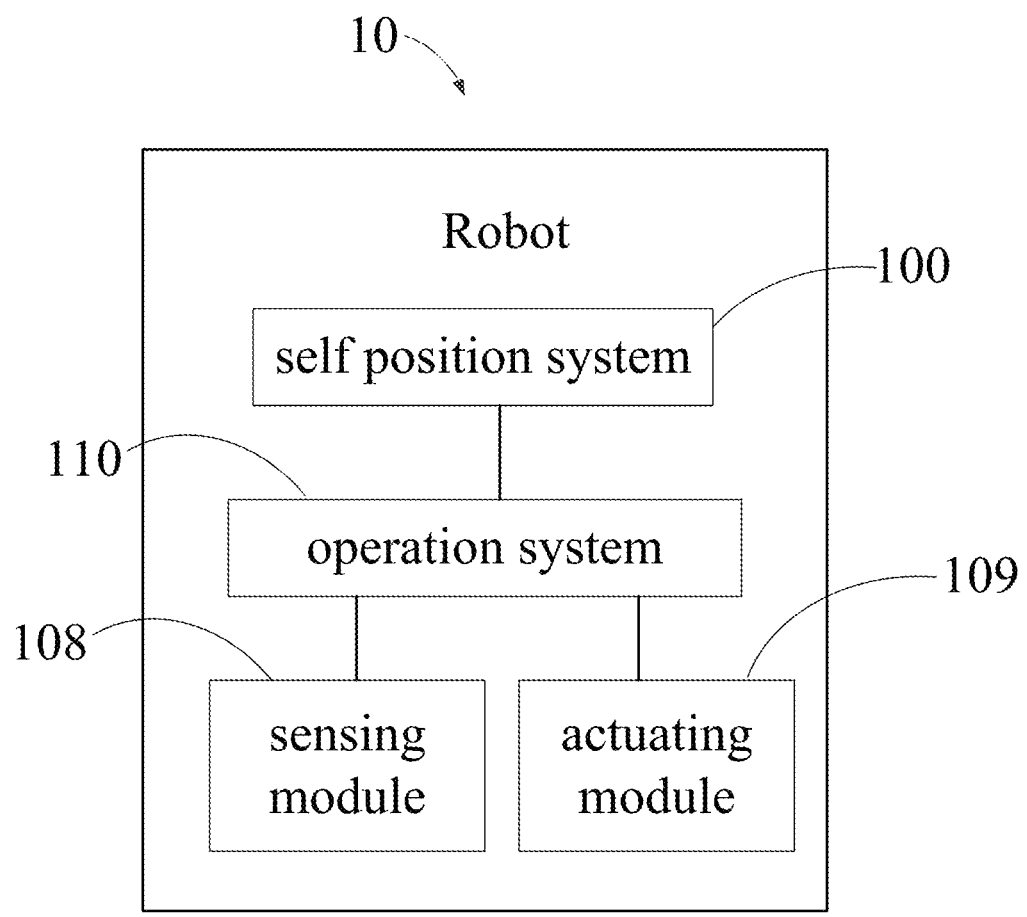
FIG. 10 is a functional diagram of a robot using the self positioning systems above.

An autonomously mobile devices using the self positioning systems 100, 10A, 100B are also provided in the disclosure. Referring to FIG. 10, in one embodiment, a robot 10 is provided and includes a sensing module 108, an actuating module 109, an operation system 110 and the self positioning system 100. The sensing module 108 includes a sensor such as an image sensor, a pressure sensor, a light sensor, a magnetic field sensor, or a sound sensor. The actuating module 109 includes an electric motor, driving wheels, and transmission belt.

The controlling module 101, the image dealing module 104 and the calculating module 105 can be integrated together with the operation system 110. The spraying module 102 can be integrated together with the actuating module 109. The image acquisition module 103 can be integrated together with the sensing module 108. The image acquisition module 103 can be installed on the face of the robot 10 and used as eyes. The image acquisition module 103 can be installed on the back of the robot 10.

Figure 11:
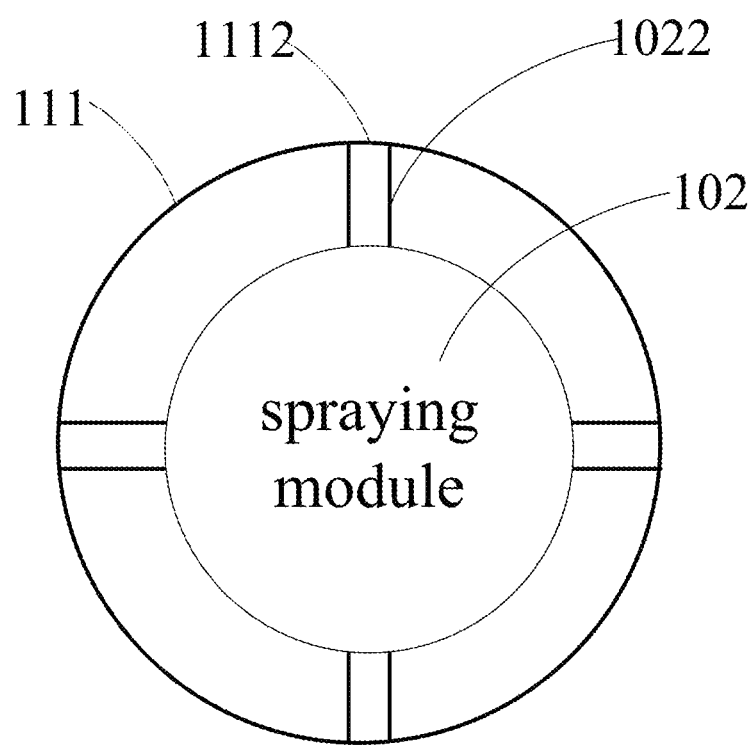
FIG. 11 is a schematic structural view of a wheel and a spraying module of the robot of FIG. 9.

Referring to FIG. 11, in one embodiment, the spraying module 102 is installed on the driving wheel 111 of the actuating module 109. The driving wheel 111 has a plurality of through holes 1112 on the cylindrical surface. The spraying module 102 is located inside the driving wheel 111 and includes a plurality of nozzles 1022. Each of the plurality of nozzles 1022 has one end extending to one of the plurality of through holes 1112. The spraying module 102 can spray the liquid or paste out of the driving wheel 111 from the plurality of through holes 1112 through the plurality of nozzles 1022. In one embodiment, the plurality of through holes 1112 having different shapes and sizes are arranged along the circle of the driving wheel 111 and spaced from each other. When the driving wheel 111 turns a circle, a plurality of feature points having different shapes and sizes and spaced from each other can be formed on the floor.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to viewed for identification purposes and not as a suggestion as to an order for the steps.

What is claimed is:

1. A self positioning system, comprising:
a controlling module;
a spraying module configured to spray a liquid or paste to form a feature point in a surrounding environment around the self positioning system;
an image acquisition module configured to acquire a plurality of images of the feature point and the surrounding environment;
an image dealing module configured to deal the plurality of images by selecting the feature point in the plurality of images; and
a calculating module configured to calculate position information according to position change of the feature point in the plurality of images.

2. The self positioning system of claim 1, wherein the controlling module is configured to control the self positioning system to perform a method comprising following steps:

step (S11), spraying the liquid or paste to form the feature point in the surrounding environment, and go to step (S12);

step (S12), acquiring the plurality of images of the feature point and the surrounding environment at different time points, and go to step (S13);

step (S13), dealing the plurality of images by selecting the feature point in the plurality of images, and go to step (S14); and step (S14), calculating the position information according to the position change of the feature point in the plurality of images.

3. The self positioning system of claim 1, further comprising a color selecting module configured to analyze a first color of the surrounding environment and select a second color of the liquid or paste so that the second color of the liquid or paste is different from the first color of the surrounding environment.

4. The self positioning system of claim 3, wherein the controlling module is configured to control the self positioning system to perform a method comprising following steps:

step (S20), acquiring a base image of the surrounding environment having the first color, and go to step (S21);

step (S21), selecting the second color which is different from the first color of the surrounding environment, and go to step (S22);

step (S22), spraying the liquid or paste to form the feature point having the second color in the surrounding environment, and go to step (S23);

step (S23), acquiring the plurality of images of the feature point and the surrounding environment at different time points, and go to step (S24);

step (S24), dealing the plurality of images by selecting the feature point, and go to step (S25); and step (S25), calculating the position information according to the position change of the feature point in the plurality of images.

5. The self positioning system of claim 3, wherein the controlling module is configured to control the self positioning system to perform a method comprising following steps:

step (S20), acquiring a base image of the surrounding environment having the first color, and go to step (S21);

step (S21), selecting the second color which is different from the first color of the surrounding environment, and go to step (S22);

step (S22), spraying the liquid or paste to form the feature point having the second color in the surrounding environment, and go to step (S23);

step (S23), acquiring the plurality of images of the feature point and the surrounding environment at different time points, and go to step (S24);

step (S24), dealing the plurality of images by selecting the feature point, and go to step (S25);

step (S25), calculating the position information according to the position change of the feature point in the plurality of images, and go to step (S26); and step (S26), judging whether the first color of the surrounding environment in the last one of the plurality of images is still different from the second color, if yes, go back to step (S22), if no, go back to step (S21).

6. The self positioning system of claim 1, further comprising a heating module configured to heat the feature point.

7. The self positioning system of claim 6, wherein the controlling module is configured to control the self positioning system to perform a method comprising following steps:

step (S31), spraying the liquid or paste to form the feature point in the surrounding environment, and go to step (S32);

step (S32), acquiring the plurality of images of the feature point and the surrounding environment at different time points, and go to step (S33);

step (S33), dealing the plurality of images by selecting the feature point, and go to step (S34);

step (S34), calculating the position information according to the position change of the feature point in the plurality of images, and go to step (S35); and step (S35), removing the feature point from the surrounding environment by heating.

8. The self positioning system of claim 6, wherein the controlling module is configured to control the self positioning system to perform a method comprising following steps:

step (S30), setting N=1, and go to step (S31);

step (S31), spraying the liquid or paste to form a $N^{th}$ feature point in the surrounding environment, and go to step (S32);

step (S32), acquiring the plurality of images of the $N^{th}$ feature point and the surrounding environment at different time points, and go to step (S33);

step (S33), dealing the plurality of images by selecting the $N^{th}$ feature point, and go to step (S34);

step (S34), calculating the position information according to the position change of the $N^{th}$ feature point in the plurality of images, and go to step (S35);

step (S35), judging whether the $N^{th}$ feature point is in a visual field of the image acquisition module, if yes, go to step (S37), if no, go to step (S36);

step (S36), removing the $N^{th}$ feature point from the surrounding environment by heating, and go to step (S37); and step (S37), setting N=N+1, and go back to step (31).

9. The self positioning system of claim 6, wherein the controlling module is configured to control the self positioning system to perform a method comprising steps:

step (S30), setting N=1, and go to step (S31);

step (S31), spraying the liquid or paste to form a $N^{th}$ feature point in the surrounding environment, and go to step (S32);

step (S32), acquiring the plurality of images of the $N^{th}$ feature point and the surrounding environment at different time points, and go to step (S33);

step (S33), dealing the plurality of images by selecting the $N^{th}$ feature point, and go to step (S34);

step (S34), calculating the position information according to the position change of the $N^{th}$ feature point in the plurality of images, and go to step (S35);

step (S35), judging whether the $N^{th}$ feature point is in a visual field of the image acquisition module, if yes, go back to step (S32), if no, go to step (S36);

step (S36), removing the $N^{th}$ feature point from the surrounding environment by heating, and go to step (S37); and step (S37), setting N=N+1, and go back to step (31).

10. An autonomously mobile device comprising a sensing module, an actuating module, an operation system and a self positioning system; wherein the self positioning system comprises:
  a controlling module;
  a spraying module configured to spray a liquid or paste to form a feature point in a surrounding environment;
  an image acquisition module configured to acquire a plurality of images of the feature point and the surrounding environment;
  an image dealing module configured to deal the plurality of images by selecting the feature point in the plurality of images; and
  a calculating module configured to calculate position information according to position change of the feature point in the plurality of images.

11. The autonomously mobile device of claim 10, wherein the controlling module is configured to control the self positioning system to perform a method comprising following steps:
  step (S11), spraying the liquid or paste to form the feature point in the surrounding environment, and go to step (S12);
  step (S12), acquiring the plurality of images of the feature point and the surrounding environment at different time points, and go to step (S13);
  step (S13), dealing the plurality of images by selecting the feature point in the plurality of images, and go to step (S14); and
  step (S14), calculating the position information according to the position change of the feature point in the plurality of images.

12. The autonomously mobile device of claim 10, wherein the self positioning system further comprises a color selecting module configured to analysis a first color of the surrounding environment and select a second color of the liquid or paste so that the second color of the feature point is different from the first color of the surrounding environment.

13. The autonomously mobile device of claim 12, wherein the controlling module is configured to control the self positioning system to perform a method comprising following steps:
  step (S20), acquiring a base image of the surrounding environment having the first color, and go to step (S21);
  step (S21), selecting the second color which is different from the first color of the surrounding environment, and go to step (S22);
  step (S22), spraying the liquid or paste to form the feature point having the second color in the surrounding environment, and go to step (S23);
  step (S23), acquiring the plurality of images of the feature point and the surrounding environment at different time points, and go to step (S24);
  step (S24), dealing the plurality of images by selecting the feature point, and go to step (S25); and
  step (S25), calculating the position information according to the position change of the feature point in the plurality of images.

14. The autonomously mobile device of claim 12, wherein the controlling module is configured to control the self positioning system to perform a method comprising following steps:
  step (S20), acquiring a base image of the surrounding environment having the first color, and go to step (S21);
  step (S21), selecting the second color which is different from the first color of the surrounding environment, and go to step (S22);
  step (S22), spraying the liquid or paste to form the feature point having the second color in the surrounding environment, and go to step (S23);
  step (S23), acquiring the plurality of images of the feature point and the surrounding environment at different time points, and go to step (S24);
  step (S24), dealing the plurality of images by selecting the feature point, and go to step (S25);
  step (S25), calculating the position information according to the position change of the feature point in the plurality of images, and go to step (S26); and
  step (S26), judging whether the first color of the surrounding environment in the last one of the plurality of images is still different from the second color, if yes, go back to step (S22), if no, go back to step (S21).

15. The autonomously mobile device of claim 10, wherein the self positioning system further comprises a heating module configured to heat the feature point.

16. The autonomously mobile device of claim 15, wherein the controlling module is configured to control the self positioning system to perform a method comprising following steps:
  step (S31), spraying the liquid or paste to form the feature point in the surrounding environment, and go to step (S32);
  step (S32), acquiring the plurality of images of the feature point and the surrounding environment at different time points, and go to step (S33);
  step (S33), dealing the plurality of images by selecting the feature point, and go to step (S34);
  step (S34), calculating the position information according to the position change of the feature point in the plurality of images, and go to step (S35); and
  step (S35), removing the feature point from the surrounding environment by heating.

17. The autonomously mobile device of claim 15, wherein the controlling module is configured to control the self positioning system to perform a method comprising following steps:
  step (S30), setting N=1, and go to step (S31);
  step (S31), spraying the liquid or paste to form a $N^{th}$ feature point in the surrounding environment, and go to step (S32);
  step (S32), acquiring the plurality of images of the $N^{th}$ feature point and the surrounding environment at different time points, and go to step (S33);
  step (S33), dealing the plurality of images by selecting the $N^{th}$ feature point, and go to step (S34);
  step (S34), calculating the position information according to the position change of the $N^{th}$ feature point in the plurality of images, and go to step (S35);
  step (S35), judging whether the $N^{th}$ feature point is in a visual field of the image acquisition module, if yes, go to step (S37), if no, go to step (S36);
  step (S36), removing the $N^{th}$ feature point from the surrounding environment by heating, and go to step (S37); and
  step (S37), setting N=N+1, and go back to step (31).

18. The autonomously mobile device of claim 15, wherein the controlling module is configured to control the self positioning system to perform a method comprising following steps:
  step (S30), setting N=1, and go to step (S31);

step (S31), spraying the liquid or paste to form a $N^{th}$ feature point in the surrounding environment, and go to step (S32);

step (S32), acquiring the plurality of images of the $N^{th}$ feature point and the surrounding environment at different time points, and go to step (S33);

step (S33), dealing the plurality of images by selecting the $N^{th}$ feature point, and go to step (S34);

step (S34), calculating the position information according to the position change of the $N^{th}$ feature point in the plurality of images, and go to step (S35);

step (S35), judging whether the $N^{th}$ feature point is in a visual field of the image acquisition module, if yes, go back to step (S32), if no, go to step (S36);

step (S36), removing the $N^{th}$ feature point from the surrounding environment by heating, and go to step (S37); and step (S37), setting N=N+1, and go back to step (31).

19. The autonomously mobile device of claim 10, wherein the spraying module is installed on a driving wheel of the actuating module.

20. The autonomously mobile device of claim 19, wherein the driving wheel comprises a plurality of through holes on a cylindrical surface; the spraying module is located inside the driving wheel and comprises a plurality of nozzles; and each of the plurality of nozzles has one end extending to one of the plurality of through holes.

* * * * *